United States Patent [19]

Gusching et al.

[11] Patent Number: 4,604,810
[45] Date of Patent: Aug. 12, 1986

[54] POST PROCESS DIAMETER GAGE

[75] Inventors: Nagle V. Gusching, Sidney; Richard R. Daulton, Cincinnati, both of Ohio

[73] Assignee: The Monarch Machine Tool Company, Sidney, Ohio

[21] Appl. No.: 770,709

[22] Filed: Aug. 29, 1985

[51] Int. Cl.[4] .............................................. G01B 7/12
[52] U.S. Cl. .................... 33/178 E; 33/555
[58] Field of Search ............ 33/147 E, 178 D, 178 E, 33/548, 550, 555, 557

[56] References Cited

U.S. PATENT DOCUMENTS

| | | | |
|---|---|---|---|
| 2,254,812 | 9/1941 | Aller | 33/178 E |
| 2,547,719 | 4/1951 | Rosser | 33/178 E |
| 2,717,449 | 9/1955 | Graham | 33/555 |
| 3,795,055 | 3/1974 | Zucco | 33/550 |
| 4,109,946 | 8/1978 | Pennings et al. | 228/4.5 |
| 4,136,455 | 1/1979 | Owsen | 33/178 E |
| 4,208,796 | 6/1980 | Michaud et al. | 33/147 E |
| 4,531,294 | 7/1985 | Lenz | 33/550 |

FOREIGN PATENT DOCUMENTS 0151889 11/1981 Fed. Rep. of Germany ........ 33/505

OTHER PUBLICATIONS

"A Differential Transformer Gauge for Outside and Inside Diameters of Long Tubes", by L. E. Goodwin, Jan. 1958.

Primary Examiner—Richard R. Stearns
Attorney, Agent, or Firm—Pearne, Gordon, Sessions, McCoy, Granger, & Tilberry

[57] ABSTRACT

A diameter gage is disclosed which measures a plurality of diameters on a workpiece after the workpiece has been machined. First and second U-shaped gage frames mount first and second gage blocks relative to a gage platform, and this gage platform is moved vertically upwardly to a position whereat the gage blocks of each set straddle different ones of the plurality of different diameters on the workpiece. Parallel leaf springs provide low friction mounting of the gage blocks, and also provide urging means to urge the gage blocks into contact with the opposite sides of the workpiece. An electrical output gage is moved in accordance with the relative movement between the two gage blocks of each set to provide an error signal which is passed to the numerical control to correct the machining diameter of the machine tool which machines successive workpieces.

14 Claims, 3 Drawing Figures

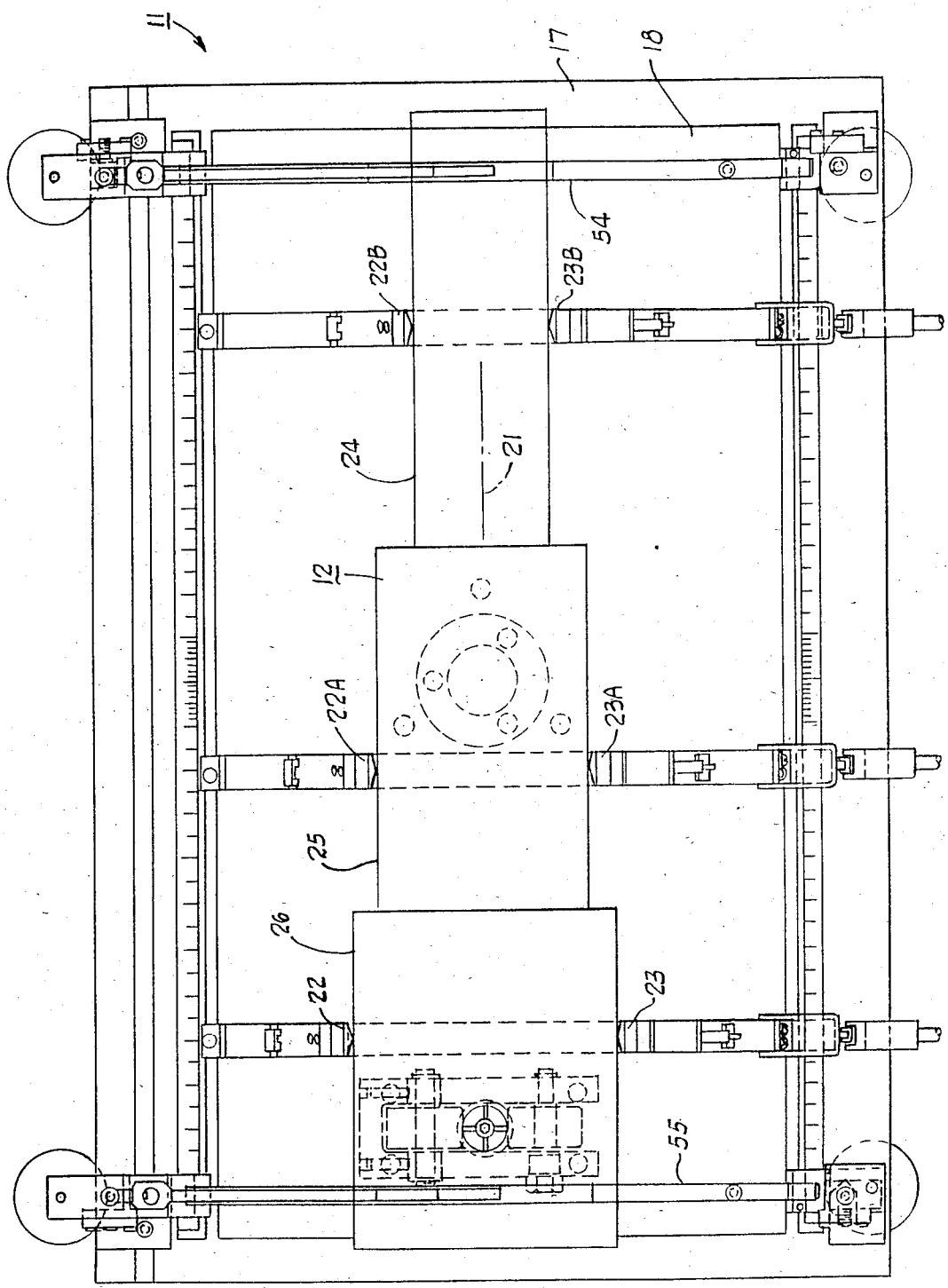

4,604,810

POST PROCESS DIAMETER GAGE

BACKGROUND OF THE INVENTION

It has been proposed to place a constant diameter machined workpiece in Vee-blocks and to gage the diameter by a plurality of indicator probes, all calibrated to a single workpiece diameter, with the indicator probes contacting the bottom of the workpiece, and then the probes providing an electrical signal to be fed to a numerically controlled lathe to adjust cutting tool position. Since the probes are at the bottom center of the Vee-blocks, only a single diameter workpiece can be gaged and corrected in the lathe numerical control. This is shown in German Democractic Republic Pat. No. 151889.

It has also been suggested to use a rigid Vee-block in which a single diameter workpiece may be rested and the two legs of the Vee-block each carry a linear variable differential transformer to be spring-urged into contact with opposite sides of the outside diameter of the workpiece. This is used as an electrical gage of the diameter, but requires the complexity of two different transformers for measuring, plus a third receiving differential transformer to command the electrical signals.

Both of these references suggest structure which can be used with workpieces having only a constant diameter, but the great majority of workpieces have stepped diameters which need to be individually gaged. In the first reference, using a gage at the bottom center of the Vee-blocks is inherently only about one-ninth as accurate, for a given accuracy of instrumentation, compared with the present invention. In the second-mentioned system, only a single dimension part can be gaged, rather than parts of any dimension within a given range because the two linear variable displacement transformers are mounted directly on the Vee-block.

SUMMARY OF THE INVENTION

Accordingly, the problem to be solved is how to accurately gage a workpiece with multiple portions of different diameters.

This problem is solved by a post process diameter gage for a workpiece with multiple portions of different diameters comprising in combination a gage platform, drive means to relatively move said gage platform and a multiple diameter workpiece relative to each other in a plane through the workpiece centerline, at least two sets of first and second gage blocks, first means mounting said first gage block of each set on said gage platform for limited lateral movement relative to said centerline plane, second means mounting said second gage block of each set on said gage platform for limited lateral movement relative to said centerline plane with the two gage blocks of each set on opposite sides of a diameter of the workpiece, said at least two sets of first and second gage blocks being mounted on said gage platform at different longitudinal positions to gage portions of different diameters on the workpiece, spring means connected to relatively urge said first and second gage blocks of each set toward the workpiece centerline, an electrical output gage connected to be moved in accordance with relative movement between said first and second gage blocks of each set, means adapted to connect said electrical output gages to a numerical control of the machine tool machining successive workpieces, and said drive means being controllable to relatively advance said gage platform and a workpiece to a position whereat said sets of gage blocks are urged by said spring means to contact opposite sides of plural diameters of a workpiece machined by the numerically controlled machine tool to gage at least two different diameter portions of the workpiece to correct the cutting diameters of the machine tool in accordance with variation from desired dimensions of the workpiece.

Accordingly, an object of the invention is to provide a gage to accurately measure plural diameters on a given workpiece.

Another object of the invention is to provide means to automatically gage plural diameters on a workpiece and to correct the cutting tool position of a numerically controlled machine tool.

A further object of the invention is to provide an electrical gage to measure multiple diameters of a workpiece with only a single electrical output gage for each diameter.

A still further object of the invention is to provide a means to automatically gage multiple diameters of a workpiece and correct for deviations from standard in successive workpieces.

Other objects and a fuller understanding of the invention may be had by referring to the following description and claims, taken in conjunction with the accompanying drawing.

BRIEF DESCRIPTION OF THE DRAWINGS

FIG. 3 is an enlarged top view of the gage of FIG. 1.

DESCRIPTION OF THE PREFERRED EMBODIMENT

Figure 1:
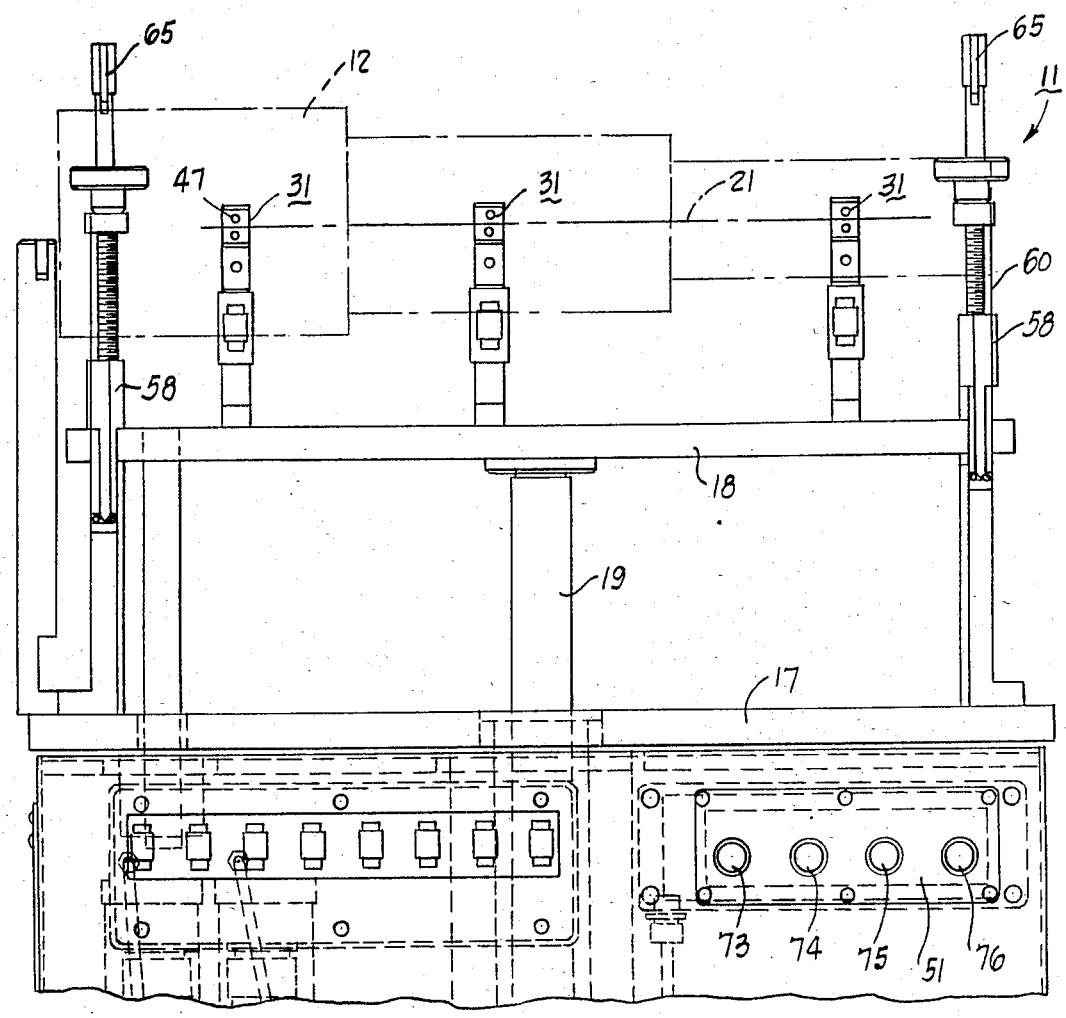
FIG. 1 is a side view of a post process diameter gage according to the invention, with a workpiece shown in phantom.

The figures of the drawing illustrate a post process diameter gage 11 illustrating the invention. This gage is intended to gage the plural diameters of a workpiece 12 after it has been machined in a machine tool such as a lathe which is numerically controlled. The workpiece 12 shown in the drawings is one with a plurality of different diameters, three being shown, and this is a typical workpiece with plural diameters to be machined and then subsequently gaged to determine if the machined diameter is correct. The gage 11 then applies diameter corrections to a numerical control 13, such as a computer numerical control of a machine tool 14. After a workpiece has been machined by the machine tool 14, it may be moved manually, or preferably by a robot, and transferred to the post process diameter gage 11 for gaging.

The diameter gage 11 includes a frame 17 which movably mounts a gage platform 18. A piston and cylinder 19 is connected to move the gage platform 18 between advanced and retracted positions along a centerline plane 20, which contains the axis 21 of the workpiece 12. This centerline plane may be horizontal, or at an angle to the horizontal, but in this embodiment is shown as being vertical, and the gage platform 18 is raised to the advanced position shown in the figures.

Figure 2:
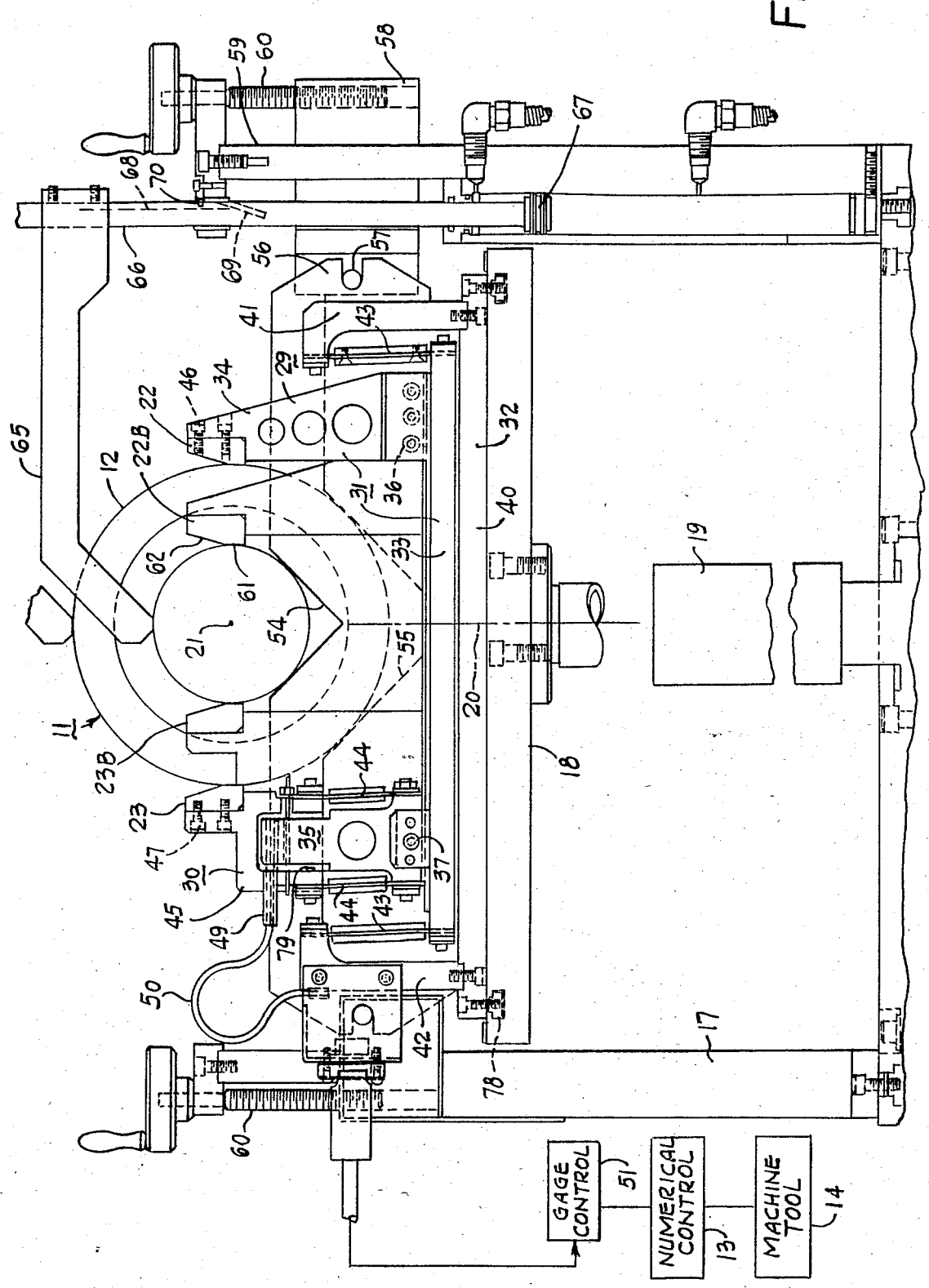
FIG. 2 is a slightly enlarged end view of the gage of FIG. 1.

The gage platform 18 carries at least two sets of first and second gage blocks each. FIGS. 1 and 3 show that three such sets of gage blocks are utilized in this example. To avoid confusion, FIG. 2 shows only one set of gage blocks for the largest diameter, and partially shows the set for the smallest diameter. Each set of gage blocks is adapted to be disposed on opposite sides of a diameter of a workpiece to gage three different diameters of the workpiece. The sets of gage blocks are narrow so that six, eight, or ten sets can be used, for example, on the post process diameter gage 11. Each of these sets is identical, and only one set will be described in detail.

FIG. 2 shows the first and second gage blocks 22 and 23, respectively, which are adapted to engage the largest diameter 26 on the workpiece 12. Other sets of gage blocks 22a and 23A are adapted to engage the intermediate diameter 25 and gage blocks 22B and 23B are diagrammatically shown to gage the smallest diameter 24 of the workpiece. First and second mounting means 29 and 30, respectively, are provided to mount the first and second gage blocks 22 and 23 relative to the gage platform 18. This first and second mounting means 29 and 30 includes a first U-shaped gage frame 31 and a second U-shaped gage frame 32. The first U-shaped gage frame 31 includes a dovetail slide 33 and first and second legs 34 and 35. The first leg 34 is adjustably mounted and clampable by screws 36 along the dovetail slide 33, so as to be positionable relative to the axis 21 of the workpiece 12. In a similar manner, the second leg 35 is adjustable and clampable by screws 37 on this dovetail slide 33. The second U-shaped gage frame 32 includes a base 40 and first and second upstanding legs 41 and 42, respectively. Spring means is provided to relatively urge the first and second gage blocks 22 and 23 toward the workpiece centerline plane 20. In this preferred embodiment, the spring means includes first spring means 43 which mounts the first gage frame 31 on the second gage frame 32 in a manner for low friction movement. To this end, the first spring means 43 includes parallel leaf springs which are secured to the upper end of the legs 41 and 42 and depend downwardly to be secured to the dovetail slide 33. The leaf springs act to center the dovetail slide 33 along the centerline plane 20, with the leaf springs being vertical and providing a type of parallelogram movement for the dovetail slide 33.

The second leg 35 of the first gage frame 31 carries an auxiliary leg 45 which straddles this second leg 35 and is supported thereon by upstanding second spring means 44. This second spring means is again parallel leaf springs, with the lower end secured to the bottom of the second leg 35 and the upper end secured to the depending ends of the auxiliary leg 45. In this manner, the auxiliary leg 45 is mounted for limited lateral movement relative to the centerline plane 20 in a low friction mounting, and with this spring means 44 urging the second gage block 23 toward the centerline plane. The first gage block 22 is secured by the mounting screws 46 on the first leg 34 of the first frame 31, and the second mounting block 23 is mounted by screws 47 on the auxiliary leg 45.

An electrical output gage 49 is mounted to be responsive to movement between the first and second gage blocks 22 and 23. To this end, it is mounted for relative movement between the auxiliary leg 45 and the second leg 35 of the first gage frame 31. The electrical output gage may be anything suitable, for example, a linear variable displacement transformer, and is connected by a cable 50 to a gage control 51, which in turn is connected to control the numerical control unit 13 of the machine tool 14.

The post process diameter gage is adapted to measure plural diameters of the workpiece 12, which diameters have been machined by the machine tool 14. The gage 11 may be mounted to coact directly with the machine tool, and with the workpiece 12 still mounted in that machine tool. In such a case, the centerline plane 20 would contain the axis 21 of the workpiece 12 as mounted in the machine tool. In the preferred embodiment, however, in order to save cycling time between successive workpieces, the workpiece 12 is designed to be removed from the machine tool 14, e.g., by a robot arm, and placed at the post process diameter gage 11 for gaging. To accommodate this, the diameter gage 11 includes first and second Vee-blocks 54 and 55, respectively. The first Vee-block 54 is shown as cooperating with the smallest diameter portion 24 of the workpiece, and the second Vee-block 55 is shown as cooperating with the largest diameter portion 26 of the workpiece. To accommodate a wide range of diameters of workpieces, the first Vee-block 54 may have a smaller Vee than the second Vee-block e.g., to support workpiece portions of one to three inches in diameter, and the second Vee-block having a Vee to support a larger portion such as three to six inches in diameter. Each end of the Vee-block 54 has a fork 56 which straddles a pin 57 which is mounted on a block 58 vertically slidable on bearing post 59. A handwheel-operated screw 60 at each end of the respective Vee-block may be actuated to adjust the vertical position of the Vee-block so that when a workpiece is placed in the Vee-blocks, the axis 21 thereof will be horizontal in the centerline plane 20, and at an elevation to engage the approximate center of the vertical gage surfaces 61 of the gage blocks 22 and 23. Each gage block has a diverging surface 62, so that as the gage platform 18 is raised to the advanced position, the diverging surfaces 62 engage the various diameter portions of the workpiece and slightly spread the gage blocks 22 and 23 so that they may be gaged. This slight spreading of the gage blocks is resiliently opposed by the spring means 43 and 44. An adjustable stop (not shown) stops the gage platform 18 so that the vertical gage surfaces 61 of the gage blocks are approximately centered on the diameter of the workpiece.

A hold-down arm 65 is fixed on a post 66, one for each Vee-block 54 and 55. The post 66 is connected to a fluid-actuated piston and cylinder 67 for vertical movement of this hold-down arm. Also, the post 66 has a longitudinal groove 68 with a helical portion 69 engaged by a pin 70 so that the initial downward movement of the post 66 swings the hold-down arm 65 through an arc, e.g., 90 degrees, so that this arm is out of the way when raised, and hence the workpiece 12 may be placed in the Vee-blocks, and yet the arm may be swung through an arc to engage the workpiece above the respective Vee-block when this hold-down arm is lowered by the piston and cylinder.

The gage control 51 is better shown in FIG. 1, and includes push buttons 73-76 for calibrate, manual, move-up and down, and read, respectively. The manual push button 74 is a three-position push button providing for OFF, MANUAL or RUN conditions. When set in the OFF position, the post process diameter gage 11 is de-energized. When set in the RUN position, it is set for automatic gaging and control of the numerical control 13 via the gage control 51. When set in the MANUAL position, then the diameter gage 11 may be set up and calibrated. For this calibration, the push button 75 may be actuated to move up the gage platform 18 to the advanced position as shown in FIGS. 1 and 2. A calibration part which is machined and accurately measured is used to set up the gage 11. This part is set on the Vee-blocks 54 and 55, and the handwheel screws 60 are actuated to level the axis 21 of the workpiece and to level the Vee-blocks from front to back, as shown in FIG. 2.

Enough sets of first and second gage frames 31 and 32 are mounted on the gage platform 18 as desired. This may be as many as ten, for example, since each set of gage frames is quite thin as shown in FIGS. 1 and 3. With the workpiece 12 as shown with three different diameters, these three different diameters are to be gaged, and hence three sets of gage frames are utilized. These are positioned and clamped at the desired longitudinal positions by screws and T-head nuts 78 on the gage platform 18. For each of the three sets of gage frames, the set-up is similar. The calibration part is placed on the Vee-rests and the push button 75 actuated to move the gage frame up into position. The hold-down arms 65 will be swung over and down to contact the part just above the two Vee-blocks. The screws 36 on the first leg 34 are loosened and the leg 34 moved into contact with the particular diameter portion of the workpiece 12. The first leg 34 should not only contact the part, but also the dovetail slide 33 should be pushed backwardly a small amount, e.g., 0.050 inch, and then the screws 36 tightened. This will cause the first spring means 43 to be deflected to the right at the bottom, as shown in FIG. 2, so that there is a slight urging from this spring means 43 to urge the gage block 22 against the workpiece. A thin shim, e.g, 0.050 inch thick, should be placed between a limit screw 79 and the upstanding second leg 35. This will deflect the second spring means 44 about as shown in FIG. 2. The screws 37 are then loosened and the second gage block 23 moved into contact with the workpiece 12. The screws 37 are then tightened and the shim may then be removed. The set-up will then look as shown in FIG. 2, with both the first and second spring means 43 and 44 slightly deflected and the gage blocks 22 and 23 both engaging the workpiece under the urging of these spring means. These steps are repeated for all of the sets of gage frames for the various diameters of the part. The calibrate push button 73 may be actuated to set electrical zero and then lower the gage frame 18. The calibration workpiece 12 may be removed and then the post process gage is ready for operation with the push button 74 turned to the RUN position.

During automatic operation, a part is machined in the machine tool 14 and transferred by a robot arm to the Vee-blocks 54 and 55. The hold-down arms swing over and down to engage the part, and the gage platform 18 raises so that the gage blocks 22 and 23 are in the position shown in FIG. 2. As they raise into position, the diverging surfaces 62 engage the various diameter portions of the workpiece and spread apart these two gage blocks. As the first gage block 22 moves to the right as shown in FIG. 2, it does so by deflecting the first spring means 43, and as the second gage block 23 moves to the left away from the centerline of the plane 20, this deflects the second spring means 44. Under these urging forces, the gage blocks are urged into positive gaging contact with the workpiece, and this moves the linear variable displacement transformer to obtain an electrical output proportional to the error in the diameter. This gaged diameter error is passed to the gage control 51, and this may be a plus or minus relative to the desired diameter. One or more of these consecutive workpieces may be gaged before a correction is applied to the machine tool via the numerical control 13. If a plurality of workpieces are gaged and averaged before correction, then the device manufactured in accordance with this invention has been found to hold dimensional tolerance within 0.0001 inch.

It will be noted that the first mounting means 29 to mount the first gage block 22 for limited lateral movement includes primarily the mounting of the first gage frame 31 by means of the parallel leaf springs 43. These parallel leaf springs not only give a low-friction parallelogram-type of movement, but also provide the urging means urging the first gage block 22 toward the centerline plane 20.

The second mounting means 30, which mounts the second gage block 23 for limited lateral movement relative to the centerline plane 20, is primarily a mounting of the auxiliary leg 45 on the second leg 35 of the first gage frame 31 by means of the second spring means 44. This spring means is the parallel leaf spring which provide not only a type of practically frictionless parallelogram movement, but also provide the urging means to urge the second gage block 23 toward this centerline plane.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A post process diameter gate for a workpiece with multiple portions of different diameters comprising in combination:

a gage platform;
drive means to relatively move said gage platform and a multiple diameter workpiece relative to each other in a plane through the workpiece centerline;
at least two sets of first and second gage blocks;
first means mounting said first gage block of each set on said gage platform for limited lateral movement relative to said centerline plane;
second means mounting said second gage block of each set on said gage platform for limited lateral movement relative to said centerline plane with the two gage blocks of each set on opposite sides of a diameter of the workpiece;
said at least two sets of first and second gage blocks being mounted on said gage platform at different longitudinal positions to gage portions of different diameters on the workpiece;
spring means connected to relatively urge said first and second gage blocks of each set toward the workpiece centerline;
an electrical output gage connected to be moved in accordance with relative movement between said first and second gage blocks of each set;
means adapted to connect said electrical output gages to a numerical control of the machine tool machining successive workpieces; and
said drive means being controllable to relatively advance said gage platform and a workpiece to a position whereat said sets of gage blocks are urged by said spring means to contact opposite sides of plural diameters of a workpiece machined by the numerically controlled machine tool to gage at least two different diameter portions of the workpiece to correct the cutting diameters of the machine tool in accordance with variation from desired dimensions of the workpiece.

2. A post process diameter gage as set forth in claim 1, including two Vee-blocks positioned to receive a workpiece on said centerline plane, and said drive means is connected to move said gage platform in said centerline plane.

3. A post process diameter gage as set forth in claim 1, wherein said spring means includes parallel leaf springs for generally parallelogram movement of said gage blocks relative to each other.

4. A post process diameter gage as set forth in claim 1, wherein said first and second mounting means of each set includes first and second gage frames each movable relative to said gage platform.

5. A post process diameter gage as set forth in claim 4, wherein said first gage frame of each set mounts said first and second gage blocks.

6. A post process diameter gage as set forth in claim 1, wherein said first and second mounting means of each set includes a U-shaped first gage frame carrying said first and second gage blocks.

7. A post process diameter gage as set forth in claim 6, wherein said first gage block is fixed on said first gage frame.

8. A post process diameter gage as set forth in claim 7, wherein said second gage block is movably mounted on said first gage frame.

9. A post process diameter gage as set forth in claim 1, wherein said spring means includes first and second springs connected to urge said first and second gage blocks, respectively, toward said centerline plane.

10. A post process diameter gage as set forth in claim 9, wherein said first and second springs are parallel leaf springs.

11. A post process diameter gage as set forth in claim 1, wherein said first and second mounting means includes first and second U-shaped gage frames in each set with said first gage frame mounting said first and second gage blocks and said second U-shaped gage frame mounting said first U-shaped gage frame in a manner for low friction relative movement therebetween.

12. A post process diameter gage as set forth in claim 11, wherein said spring means establishes said low friction mounting.

13. A post process diameter gage as set forth in claim 12, wherein said second gage block is mounted in a manner for low friction movement relative to said first gage frame.

14. A post process diameter gage as set forth in claim 13, wherein said spring means establishes said low friction mounting of said first gage block.

* * * * *